US005199831A

United States Patent [19]

Broucksou

[11] Patent Number: 5,199,831

[45] Date of Patent: Apr. 6, 1993

[54] INFINITELY POSITIONABLE NOSE COUPLING

[75] Inventor: Robert Broucksou, Columbia, S.C.

[73] Assignee: Cooper Industries, Inc., Houston, Tex.

[21] Appl. No.: 829,198

[22] Filed: Feb. 3, 1992

[51] Int. Cl.[5] .................... B23B 49/02

[52] U.S. Cl. .................... 408/72 R; 192/44; 408/241 R

[58] Field of Search .................... 192/27, 44; 408/72 R, 408/72 B, 241 R, 241 B, 241 G

[56] References Cited

U.S. PATENT DOCUMENTS

| | | | |
|---|---|---|---|
| 247,669 | 9/1881 | Mallett et al. | 192/44 X |
| 2,001,668 | 5/1935 | Maier | 192/44 |
| 3,243,023 | 3/1966 | Boyden | 192/44 X |
| 3,476,226 | 11/1969 | Massey | 192/27 |
| 4,588,334 | 5/1986 | Khurana | 408/241 G |
| 4,643,621 | 2/1987 | Fuller, Jr. et al. | 408/241 R X |
| 4,668,134 | 5/1987 | Vindez | 408/241 R X |
| 4,752,158 | 6/1988 | Riley | 408/72 R X |

*Primary Examiner*—Steven C. Bishop

*Attorney, Agent, or Firm*—Alan R. Thiele; Eddie Scott

[57] ABSTRACT

The infinitely positionable coupling system of the present invention includes a hollow outer race, a hollow inner race, and a locking assembly which permits locking of the hollow inner race to the hollow outer race in an infinite number of positions. The hollow outer race engages a nose piece and the hollow inner race threadably engages the drill housing. Accordingly, the nose piece is infinitely positionable with respect to the drill housing by positioning the hollow inner race with respect to the hollow outer race and allowing the locking assembly to hold them in position one with respect to the other.

10 Claims, 3 Drawing Sheets

INFINITELY POSITIONABLE NOSE COUPLING

BACKGROUND OF THE INVENTION

The present invention relates to power tools; more particularly the present invention relates to power tools in which a nose piece and drill bushing are utilized for guiding a drill bit through a drill fixture into a work piece.

In many drilling operations, particularly aircraft, it is well known to utilize drilling apparatus including a nose piece with a taper lock style drill bushing mounted at its outboard end. The taper lock style drill bushing is used to lock the drilling apparatus to a drill fixture which is then positioned over a work piece. Typically, the drill fixture is rigidly mounted to the work piece to assure accurate placement of the drilled hole. The drill fixture includes two fasteners which are used to lock the taper lock style drill bushing in position against the drill fixture. The taper lock style drill bushing is usually threaded into a nose piece at the end of a power drill and the nose piece is then rigidly attached to the power drill. Consequently, when the nose piece and taper lock style drill bushing are attached to the power drill, the power drill may be firmly affixed to the drill fixture thus allowing accurate drilling of a hole in the work piece.

A problem arises when the drilling apparatus has an appendage extending outwardly therefrom. Such appendage may contain operational controls, a power source, or speed reduction gearing. When it is necessary to rotate the entire drilling apparatus to position the taper lock style drill bushing with respect to the fasteners which extend from the drill fixture, the appendage extending from the drill may butt up against a bulkhead, a wall or a spar. Such problems frequently occur when the hole to be drilled is in a corner. This contact of the appendage with the bulk-head, wall or spar prevents the full rotation of the drilling apparatus thus preventing proper engagement of the taper lock style drill bushing with the fasteners which extend from the drill fixture. To solve this problem a system is required in which the nose piece may be rotatably positioned with respect to the rest of the drill apparatus while the drill apparatus is in position for drilling a hole. Ideally, such system should provide an infinite range of positions of the nose piece with respect to the rest of the drilling apparatus. Such system would allow the appendage extending from the drill to not interfere with the locking of the drilling apparatus to the drill fixture.

SUMMARY OF THE INVENTION

The infinitely positionable nose coupling system of the present invention includes a hollow outer race, a hollow inner race, and a locking assembly which permits locking of the hollow inner race to the hollow outer race in an infinite number of positions. The hollow outer race engages a nose piece and the hollow inner race threadably engages the drill housing. Accordingly, the nose piece is infinitely positionable with respect to the drill housing by positioning the hollow inner race with respect to the hollow outer race and allowing the locking assembly to hold the races in position one with respect to the other.

A better understanding of the infinitely positionable indexing nose coupling of the present invention may be had from a brief explanation of the construction of each portion and its interaction with the other parts.

The hollow inner race has an internally threaded proximal ring portion for attachment to the drill housing and a central portion having a plurality of flats on which rollers are positioned. The rollers are separated by coil springs. Coil springs position the rollers with respect to the inner race. The rollers are further positioned with respect to the inner race by the cage portion of a locking assembly. Accordingly, when the cage portion of the locking assembly is rotated, the coil springs between the rollers are compressed and the hollow outer race may be rotated with respect to the hollow inner race. When the locking assembly is released, the coil springs extend thus causing the rollers to become wedged in the space between the flats on the exterior of the hollow inner race and the interior of the hollow outer race. This wedging action of the rollers firmly positions the outer race with respect to the inner race. Accordingly, the position of the nose piece is then fixed with respect to the position of the drill housing.

A BRIEF DESCRIPTION OF THE FIGURES

A better understanding of the indexing coupling of the present invention may be had by reference to the figures wherein.

A BRIEF DESCRIPTION OF THE EMBODIMENTS

Figure 1:
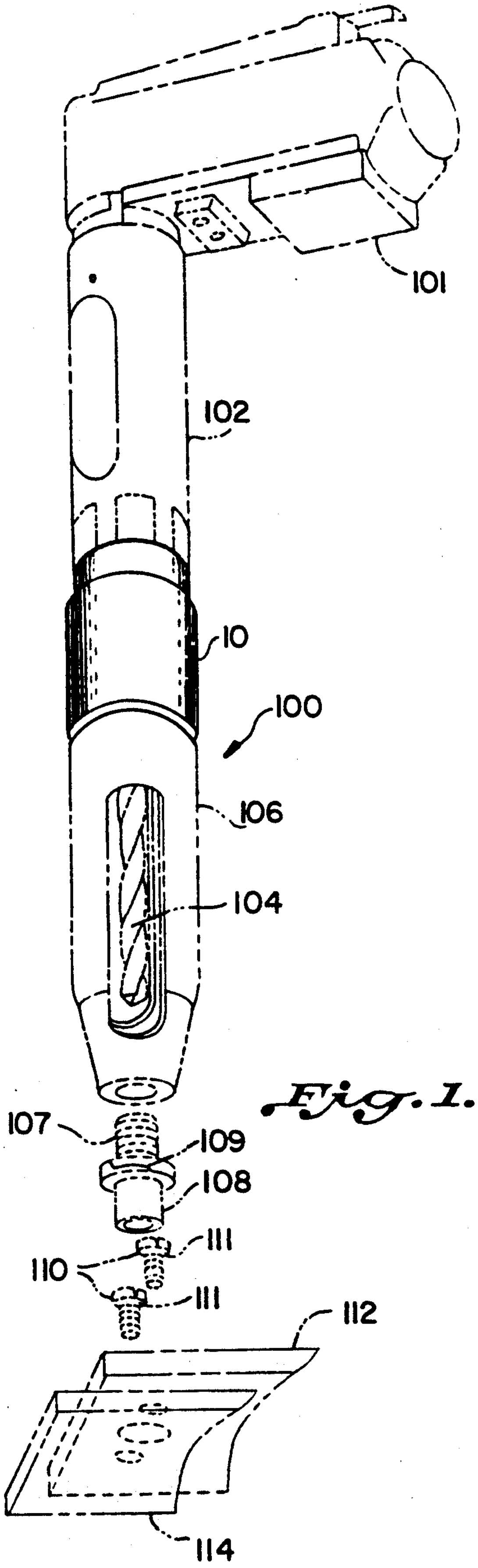
FIG. 1 is a perspective view of the indexing coupling of the present invention installed in a drilling apparatus.

As may be seen by reference to FIG. 1, a drilling system generally 100 typically includes a power unit 102. Attached to the power unit 102 is a chuck (not shown) for holding and rotating a drill bit 104. At the front end of drilling system 100 is a nose piece 106. The nose piece 106 provides a mounting for a taper lock style drill bushing 108. The taper lock style drill bushing 108 includes an external cam surface 109 which interacts with the undersides 111 of the heads of two fasteners 110. The fasteners 110 are positioned with respect to a drill fixture 112 over a work piece 114.

When it is desired to drill a hole in a work piece 114, drill fixture 112 is placed over the site of the hole in work piece 114. Drilling system 100 is rigidly positioned with respect to drill fixture 112 by the interaction of the external cam surface 109 of the taper lock style drill bushing 108 with the underside 111 of the fasteners 110 which protrude from the drill fixture 112. Taper lock style drill bushing 108 threadably 107 engages nose piece 106. The advancing drill bit 104 passes through and is guided by taper lock style drill bushing 108, thence through drill fixture 112 and into work piece 114.

When it is desired to disengage the drilling system 100 from the drill fixture 112, the operator rotates the drilling system 100 around its long axis. Taper lock style drill bushing 108 disengages fasteners 110 and drilling system 100 is moved away from drill fixture 112.

As may be further seen with reference to FIG. 1, there is oftentimes an appendage 101 which extends from the long axis of the drilling system 100. If the drilling system 100 is to be used in a confined place, such as a corner, it may not be possible to rotate the complete drilling system 100 to sufficiently turn the taper lock style drill bushing 108 such that external cam surface 109 fully travels along the underside 111 of fasteners 110. Such a situation may occur when an appendage 101 of the drilling system 100 hits against a bulk-head, wall or spar. Without full engagement of the taper lock style drill bushing 108 with the drill fixture 112, drilling system 100 may wobble. Such wobble causes an improperly drilled hole, a hole with a skewed axis or a hole with an unacceptable surface finish. Accordingly, there is a need to be able to rotatably index the position of the nose piece 106 with respect to the drill power unit 102 such that the drilling system 100 may be fully engaged with drill fixture 112 and properly used irrespective of the position of the bulk-head, wall or spar.

Figure 3:
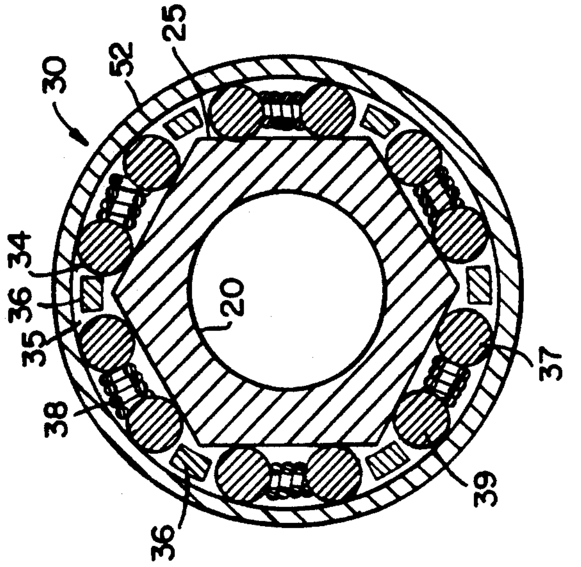
FIG. 3 is a sectional view taken at Line 2—2.
Figure 2:
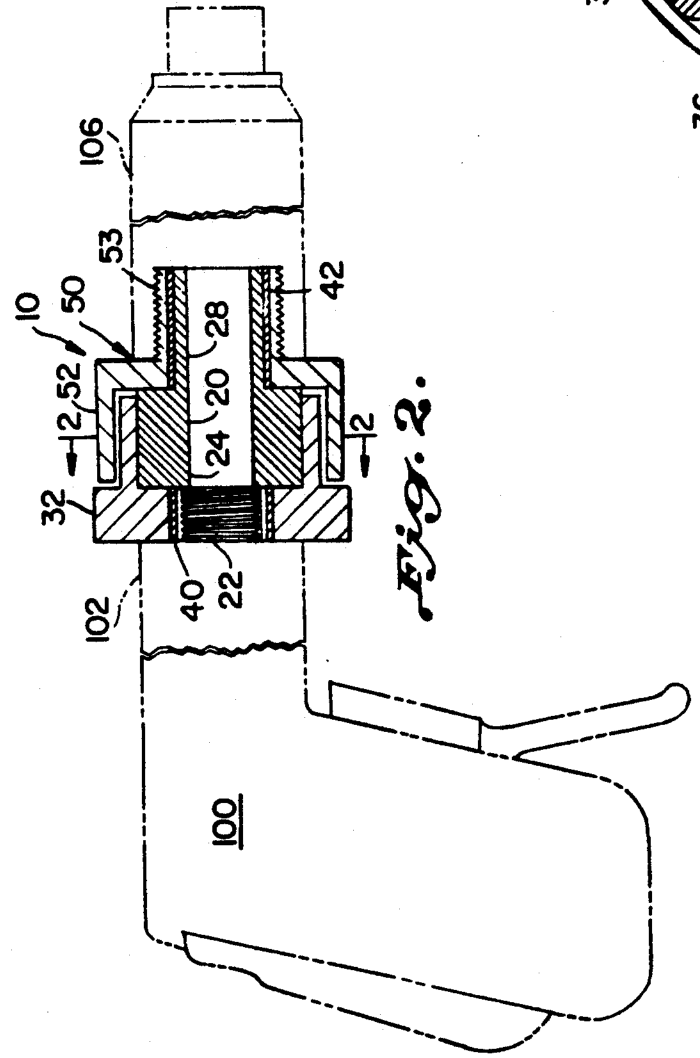
FIG. 2 is a cross sectional view of the indexing coupling of the present invention.
Figure 4:
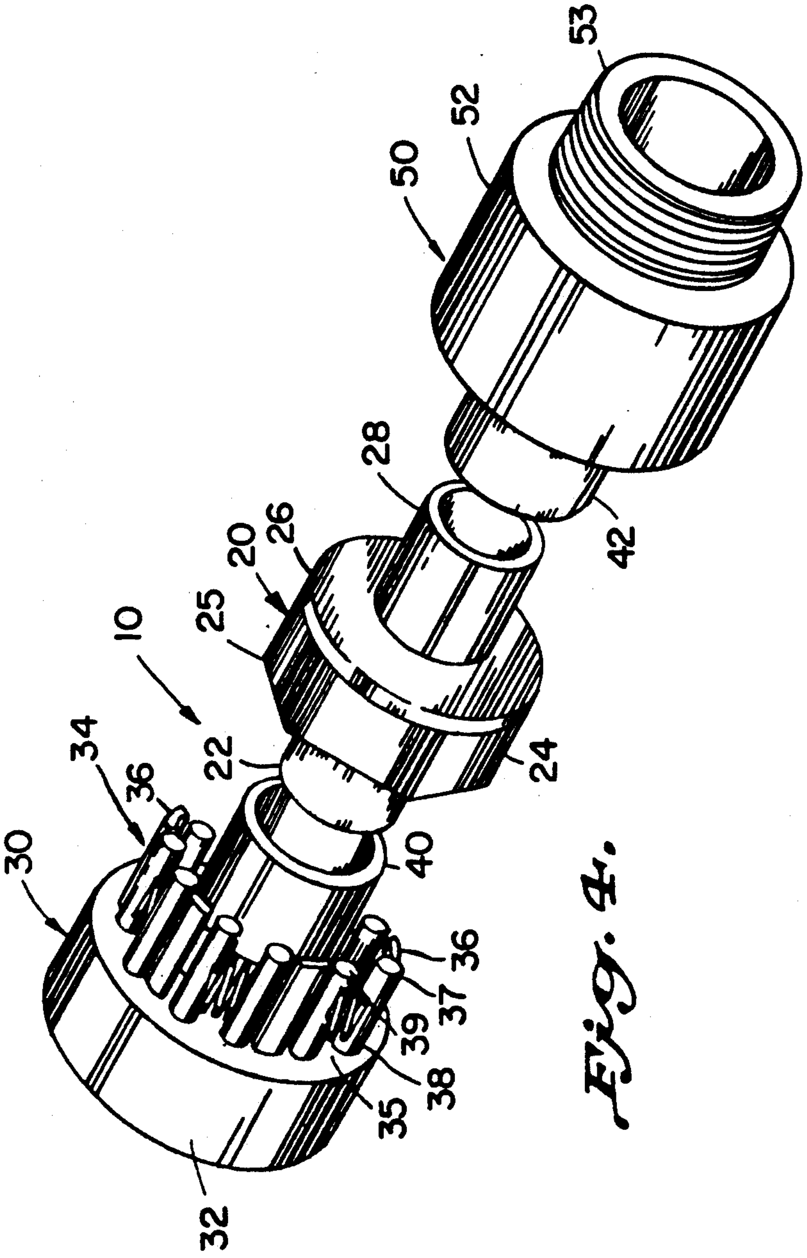
FIG. 4 is an exploded perspective view of the indexing coupling of the present invention.

Construction of the indexing nose coupling 10 of the present invention may be seen with respect to FIGS. 2, 3, and 4. Therein it may be seen that the indexing nose coupling 10 of the present invention is mounted between the housing of the power unit 102 of a drilling system 100 and the nose piece 106 at the end of the drilling system 100 into which the taper lock style drill bushing 108 is threaded. Beginning at the center line of the coupling 10 proceeding radially outward, it may be seen that the indexing coupling 10 of the present invention has three essential parts.

The first essential part, the hollow inner race 20, is threaded onto the drill power unit 102. The hollow inner race 20 includes an internally threaded proximal ring portion 22, a center portion 24 having a plurality of flats 25, a distal flange portion 26, and a distal ring portion 28. While flat surfaces 25 are shown in the preferred embodiment, it will be understood by those of ordinary skill in the art that slight curvatures in these surfaces will not detract from the operability of the invention.

The second essential part is locking assembly 30. Locking assembly 30 includes a proximal ring portion 32 which encircles the internally threaded proximal ring portion 22 of the hollow inner race 20. Formed integrally with the proximal ring portion of the locking assembly is cage portion 34. Cage portion 34 includes a plurality of spaces 35 formed by dividers 36. Fitted within spaces 35 between dividers 36 are pairs of rollers 37, 39. While coil springs 38 as shown in the preferred embodiment, other spring devices such as leaves or rubber may be used without departing from the scope of the invention. Separating rollers 37, 39 are coil springs 38. To facilitate movement of the locking assembly 30 with respect to the hollow inner race 20, a bearing assembly 40 may be inserted between the proximal ring portion 32 of the locking assembly 30 and the internally threaded proximal ring portion 22 of the inner race 20.

Fitting over the distal portion 28 of the inner race 20 is the third essential part, hollow outer race 50. Hollow outer race includes a proximal ring portion 52 which fits over cage portion 34 of the locking assembly 30 and serves to retain the rollers 37, 39 in position. The other portion of hollow outer race 50 is an externally threaded distal ring portion 53 which fits over the distal ring portion 28 of the hollow inner race 20. The distal ring portion 53 of the hollow outer race 50 is externally threaded for threadable engagement with the nose piece 106.

Placed between the distal ring portion 53 of the hollow outer race 50 and the distal ring portion 28 of the hollow inner race 20 is a bronze bearing 42 to facilitate rotation of the hollow inner race 20 with respect to the hollow outer race 50.

OPERATION

It will be understood by those of ordinary skill in the art that the inner 20 and outer 50 races may be transposed without departing from the scope of the invention. Specifically the inner race 20 could be attached to nose pieces 106 and the outer race 50 attached to power unit 102.

When it is desired to utilize the indexing coupling 10 of the present invention, the proximal ring portion 32 of the locking assembly 30 is rotated. As may be seen by reference to FIG. 3, this causes the rollers 37, 39 to move closer together. Specifically, in the preferred embodiment, coil springs 38 are compressed. Movement of one of the rollers 37, 39 closer to its roller pair mate along the flats 25 of the hollow inner race 20 causes the position of the hollow outer race 50 to not be dependent on the position of the hollow inner race 20. Accordingly, the hollow outer race 50, which is attached to the nose piece 106, may then be rotated with respect to the hollow inner race 20. This facilitates positioning of the nose piece 106 with respect to the drill housing power unit 102.

When the proximal ring portion 32 of the locking assembly 30 is released, the coil springs 38 cause the pair of rollers 37, 39 within the cage portion 34 to separate. This causes the rollers 37, 39 to wedge themselves in the space 35 formed between the flats 25 on the central portion 24 of the hollow inner race 20 and the interior 54 of the hollow outer race 50. This wedging action of the rollers 37, 39 between the flats 25 on the hollow inner race 20 and the hollow outer race 50 affixes the position of the hollow inner race 20 with respect to the hollow outer race 50. Because of the lack of detents in this system it will be understood by those of ordinary skill in the art that there are an infinite number of positions that may be assumed by the hollow inner race 20 with respect to the hollow outer race 50. Once the hollow inner race 20 and hollow outer race 50 have been affixed together, the entire drill system 100 may be utilized.

The utilization of drilling system 100 requires engagement of the cam surface 109 of the taper lock style drill bushing 108 with fasteners 110 which protrude out of a fixture 112 placed over a work piece 114 as shown in FIG. 1. Once the taper lock drill bushing 108 is engaged with drill fixture 112, the power unit 102 may then be activated and the drill bit 104 moved forward such that a hole is drilled in the work piece 114.

There is thereby provided by the indexing coupling of the present invention a means for infinitely positioning the drill housing power unit 102 of a drilling system 100 with respect to the nose piece 106 to avoid abutting a bulk-head, wall or spar.

While the infinitely positionable indexing nose coupling 10 of the present invention has been shown by reference to its preferred embodiment, it will be understood by those of ordinary skill in the art that other embodiments of the indexing nose coupling 10 of the present invention may be fabricated by those of ordinary skill in the art once having read the foregoing disclosure.

I claim:

1. A coupling for use between a drill housing and a nose piece, said coupling comprising:

means for attachment to the drill housing, said means for attachment consisting of a hollow inner race;

means for attachment to the nose piece, said means for attachment consisting of a hollow outer race; and means for providing infinitely rotatable positioning of the nose piece with respect to the drill housing, said means for provision consisting of a plurality of rollers positioned between said hollow inner race and said hollow outer race.

2. The coupling as defined in claim 1 wherein said rollers are held in position by a locking assembly.

3. An indexing coupling for infinitely positioning a nose piece with respect to a drill housing, said indexing coupling comprising:

a hollow inner race, said hollow inner race having:

an internally threaded proximal ring portion;

a central portion having a plurality of substantially flat external surfaces;

a distal ring portion;

a locking assembly, said locking assembly having:

a proximal ring portion constructed and arranged to encircle the proximal ring portion of said hollow inner race;

a cage portion;

a plurality of pairs of rollers constructed and arranged to fit within said cage portion;

biasing means for separating the individual rollers within said pairs of rollers;

a hollow outer race, said hollow outer race having:

a proximal ring portion constructed and arranged to fit over said cage portion of said locking assembly;

an externally threaded distal portion;

whereby when said proximal ring portion of said locking assembly is rotated, said cage portion moves said rollers against said biasing means and said hollow outer race may be rotated with respect to said hollow inner race, thereby positioning the nose piece with respect to the drill housing.

4. The indexing coupling as defined in claim 3 wherein said biasing means is a spring.

5. The indexing coupling as defined in claim 4 further including a distal flange portion on said hollow inner race for retaining said roller members within said cage.

6. A drill system comprising:

a source of rotational power;

a drill bit;

a drill bushing constructed and arranged for guiding said drill bit;

a nose piece for mounting said drill bushing;

an infinitely positionable indexing coupling interposed between said source of rotational power and said nose piece, said index coupling having:

means for attachment to the source of rotational power, said means for attachment consisting of a hollow inner race;

means for attachment to the nose piece, said means for attachment consisting of a hollow outer race;

means for providing infinitely rotatable positioning of the nose piece with respect to the source of rotational power, said means for provision consisting of a plurality of rollers positioned between said hollow inner race and hollow outer race.

7. The coupling as defined in claim 6 wherein said rollers are held in position by a locking assembly.

8. An indexing coupling comprising:

a hollow inner race, said hollow inner race having:

an internally threaded proximal ring portion;

a central portion having a plurality of external flats;

a distal ring portion;

a locking assembly, said locking assembly having:

a proximal ring portion constructed and arranged to encircle the proximal ring portion of said hollow inner race;

a cage portion;

a plurality of pairs of rollers constructed and arranged to fit within said cage portion;

biasing means for separating the individual rollers within said pairs of rollers;

a hollow outer race, said hollow outer race having:

a proximal ring portion constructed and arranged to fit over said cage portion of said locking assembly;

an externally threaded distal portion;

whereby when said proximal ring portion of said locking assembly is rotated, said cage portion moves said rollers against said biasing means and said hollow outer race may be rotated with respect to said hollow inner race, thereby positioning the nose piece with respect to a drill housing.

9. The indexing coupling as defined in claim 8 wherein said biasing means is a coil spring.

10. The indexing coupling as defined in claim 9 further including a distal flange portion on said hollow inner race for retaining said roller members within said cage.

* * * * *